(12) United States Patent
Nishio (10) Patent No.: US 11,260,704 B2
(45) Date of Patent: Mar. 1, 2022

(54) PNEUMATIC TIRE

(71) Applicant: The Yokohama Rubber Co., LTD., Tokyo (JP)

(72) Inventor: Koji Nishio, Hiratsuka (JP)

(73) Assignee: The Yokohama Rubber Co., LTD.

( * ) Notice: Subject to any disclaimer, the term of this patent is extended or adjusted under 35 U.S.C. 154(b) by 196 days.

(21) Appl. No.: 16/063,634

(22) PCT Filed: Dec. 14, 2016

(86) PCT No.: PCT/JP2016/087302
§ 371 (c)(1),
(2) Date: Jun. 18, 2018

(87) PCT Pub. No.: WO2017/110635
PCT Pub. Date: Jun. 29, 2017

(65) Prior Publication Data
US 2018/0370295 A1 Dec. 27, 2018

(30) Foreign Application Priority Data

Dec. 25, 2015 (JP) .............................. JP2015-255196

(51) Int. Cl.
*B60C 15/06* (2006.01)

(52) U.S. Cl.
CPC ...... *B60C 15/0653* (2013.01); *B60C 15/0635* (2013.01); *B60C 2015/065* (2013.01); *B60C 2015/066* (2013.01); *B60C 2015/0664* (2013.01); *B60C 2015/0667* (2013.01);
(Continued)

(58) Field of Classification Search
CPC ..... B60C 15/00; B60C 15/06; B60C 15/0603; B60C 15/0607; B60C 15/0628; B60C 15/0635
See application file for complete search history.

(56) References Cited

U.S. PATENT DOCUMENTS 3,406,733 A * 10/1968 Boileau ..................... B60C 9/16
152/542
4,044,811 A * 8/1977 Dudek ............... B29D 30/0679
152/452

(Continued)

FOREIGN PATENT DOCUMENTS

CN   101823410   9/2010
CN   104723804   6/2015
(Continued)

OTHER PUBLICATIONS

International Search Report for International Application No. PCT/JP2016/087302 dated Mar. 21, 2017, 4 pages, Japan.

*Primary Examiner* — Justin R Fischer
(74) *Attorney, Agent, or Firm* — Thorpe North & Western (57) ABSTRACT

A pneumatic tire mountable on a 15° tapered specified rim includes a bead core, a carcass, a steel cord reinforcing layer, a bead rubber layer, an organic fiber reinforced layer, and a first reinforcing rubber layer. A distance from a second line segment to a third line segment is from 4 mm to 12 mm, a complex modulus of the first reinforcing rubber layer is from 6 MPa to 10 MPa, an elongation at break of the first reinforcing rubber layer is from 300% to 450%, and a difference between a first height and a second height is from 3 mm to 15 mm.

4 Claims, 5 Drawing Sheets

(52) U.S. Cl.
    CPC ............ *B60C 2015/0678* (2013.01); *B60C 2015/0692* (2013.01)

(56) References Cited

U.S. PATENT DOCUMENTS

| | | | | |
|---|---|---|---|---|
| 4,495,976 | A * | 1/1985 | Makino | B60C 15/06 152/543 |
| 5,131,447 | A * | 7/1992 | Nakagawa | B60C 15/06 152/543 |
| 6,109,320 | A * | 8/2000 | Miyazaki | B60C 15/024 152/539 |
| 8,186,405 | B2 | 5/2012 | Maruoka | |
| 8,232,340 | B2 * | 7/2012 | Miyazaki | B60C 1/00 524/451 |
| 2014/0150949 | A1 | 6/2014 | Bondu | |
| 2017/0015145 | A1 * | 1/2017 | Tanaka | B60C 15/0635 |

FOREIGN PATENT DOCUMENTS

| | | | |
|---|---|---|---|
| DE | 10 2014 211 525 | | 12/2015 |
| FR | 1288149 | * | 3/1962 |
| JP | H05-112109 | | 5/1993 |
| JP | 2855327 | | 2/1999 |
| JP | 2003-063217 | | 3/2003 |
| JP | 2007-253634 | | 10/2007 |
| JP | 2008-094116 | | 4/2008 |
| JP | 2011-246086 | | 12/2011 |
| JP | 2012-020642 | | 2/2012 |
| JP | 2013-177066 | | 9/2013 |
| JP | 2015-123942 | | 7/2015 |

* cited by examiner

| | CONVENTIONAL EXAMPLE 1 | CONVENTIONAL EXAMPLE 2 | COMPARATIVE EXAMPLE 1 | COMPARATIVE EXAMPLE 2 | COMPARATIVE EXAMPLE 3 | COMPARATIVE EXAMPLE 4 | EXAMPLE 1 | EXAMPLE 2 | EXAMPLE 3 | EXAMPLE 4 | EXAMPLE 5 |
|---|---|---|---|---|---|---|---|---|---|---|---|
| DISTANCE A (mm) | 0 | 0 | 6 | 6 | 6 | 6 | 6 | 4 | 9 | 6 | 0 |
| COMPLEX MODULUS OF FIRST REINFORCING RUBBER LAYER L (MPa) | 8 | 4 | 8 | 8 | 4 | 4 | 8 | 8 | 8 | 8 | 8 |
| ELONGATION AT BREAK OF FIRST REINFORCING RUBBER LAYER L (%) | 400 | 550 | 400 | 400 | 550 | 550 | 400 | 400 | 400 | 400 | 400 |
| FIRST HEIGHT H1 (mm) | 65 | 30 | 30 | 75 | 65 | 65 | 65 | 65 | 65 | 58 | 70 |
| SECOND HEIGHT H2 (mm) | 55 | 55 | 55 | 55 | 55 | 55 | 55 | 55 | 55 | 55 | 55 |
| H1-H2 (mm) | 10 | −25 | −25 | 20 | 10 | 10 | 10 | 10 | 10 | 3 | 15 |
| FIBER ORIENTATION ANGLE β | 65 | 40 | 65 | 65 | 65 | 40 | 65 | 65 | 65 | 65 | 65 |
| NYLON CHAFER SEPARATION RESISTANCE PERFORMANCE | 100 | 50 | 130 | 140 | 145 | 90 | 200 | 180 | 180 | 150 | 150 |

FIG. 5

PNEUMATIC TIRE

TECHNICAL FIELD

The present technology relates to a pneumatic tire.

BACKGROUND ART

A pneumatic tire includes a bead portion with a bead core on either side in the tire lateral direction. A pneumatic tire is mounted on a rim wheel by the bead portion and the rim wheel engaging. Japan Patent No. 2855327 describes technology designed to improve the durability of a bead portion via a specific relationship between a bead core (bead wire) and a bead base portion.

This pneumatic tire is provided with an organic fiber reinforced layer known as a nylon chafer in a bead portion. However, cracks from an edge of the organic fiber reinforced layer may appear, and there is a demand for a countermeasure.

SUMMARY

The present technology provides a pneumatic tire that can provide suppression of cracking from an edge of an organic fiber reinforced layer.

A pneumatic tire according to an embodiment of the present technology is a pneumatic tire mountable on a 15° tapered specified rim, the pneumatic tire including:

a pair of bead portions disposed on either side of a tire equatorial plane in a tire lateral direction;

a bead core provided in each of the pair of bead portions;

a carcass supported by the pair of bead cores, the carcass including a carcass body portion and a carcass folded back portion formed by the carcass folding back at the bead core;

a steel cord reinforcing layer disposed on an outer surface of the carcass folded back at the bead core;

a bead rubber layer with at least a portion thereof disposed between the carcass body portion and the carcass folded back portion;

an organic fiber reinforced layer including an outer edge portion disposed outward from the carcass folded back portion in the tire lateral direction and outward from the carcass folded back portion in a tire radial direction, and an inner edge portion disposed within a 20 mm radius from a bead core center; and a first reinforcing rubber layer disposed in space surrounded by the bead rubber layer, the organic fiber reinforced layer, the carcass folded back portion, and the steel cord reinforcing layer;

when the pneumatic tire is not mounted on the specified rim, a distance from a second line segment to a third line segment being from 4 mm to 12 mm, a complex modulus of the first reinforcing rubber layer being from 6 MPa to 10 MPa, and an elongation at break of the first reinforcing rubber layer being from 300% to 450%, wherein a first line segment passing through an outermost projecting point of the bead core in the tire lateral direction and being parallel with a longest side of the bead core, a side of a bead base portion closer to a bead heel that is a portion of the bead portion that comes into contact with the specified rim, a curved line of a tire outer surface that is a portion of the bead portion that is located outward from the bead base portion in the tire lateral direction, a first intersection point of the side and the curved line, the second line segment passing through the first intersection point and being perpendicular to the first line segment, and the third line segment passing through the projecting point and being perpendicular to the first line segment are specified, and a difference between a first height and a second height being from 3 mm to 15 mm, wherein an outer edge portion of the first reinforcing rubber layer located outward in the tire radial direction is disposed outward in the tire radial direction from the outer edge portion of the organic fiber reinforced layer located outward in the tire radial direction, and the first height, which is a distance from the bead core center to the outer edge portion of the first reinforcing rubber layer, and the second height, which is a distance from the bead core center to the outer edge portion of the organic fiber reinforced layer, are specified.

In a pneumatic tire according to an embodiment of the present technology, a fiber orientation angle of the organic fiber reinforced layer with respect to the tire radial direction is preferably from 45° to 75°.

The present technology provides a pneumatic tire that can provide suppression of cracking from an edge of an organic fiber reinforced layer.

DETAILED DESCRIPTION

Embodiments of the present technology will be described with reference to the drawings. However, the present technology is not limited to those embodiments. Additionally, constituents described in the embodiments below can be combined, and one or more constituents can be omitted.

Herein, "tire lateral direction" refers to the direction that is parallel with a tire rotation axis of a pneumatic tire. "Inward in the tire lateral direction" refers to the direction toward the tire equatorial plane in the tire lateral direction. "Outward in the tire lateral direction" refers to the direction away from a tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

"Tire equatorial plane" refers to a plane orthogonal to the tire rotational axis that passes through the center in the tire lateral direction. "Tire equatorial line" refers to a centerline where the tire equatorial plane and the surface of a tread portion of the pneumatic tire meet.

Figure 1:
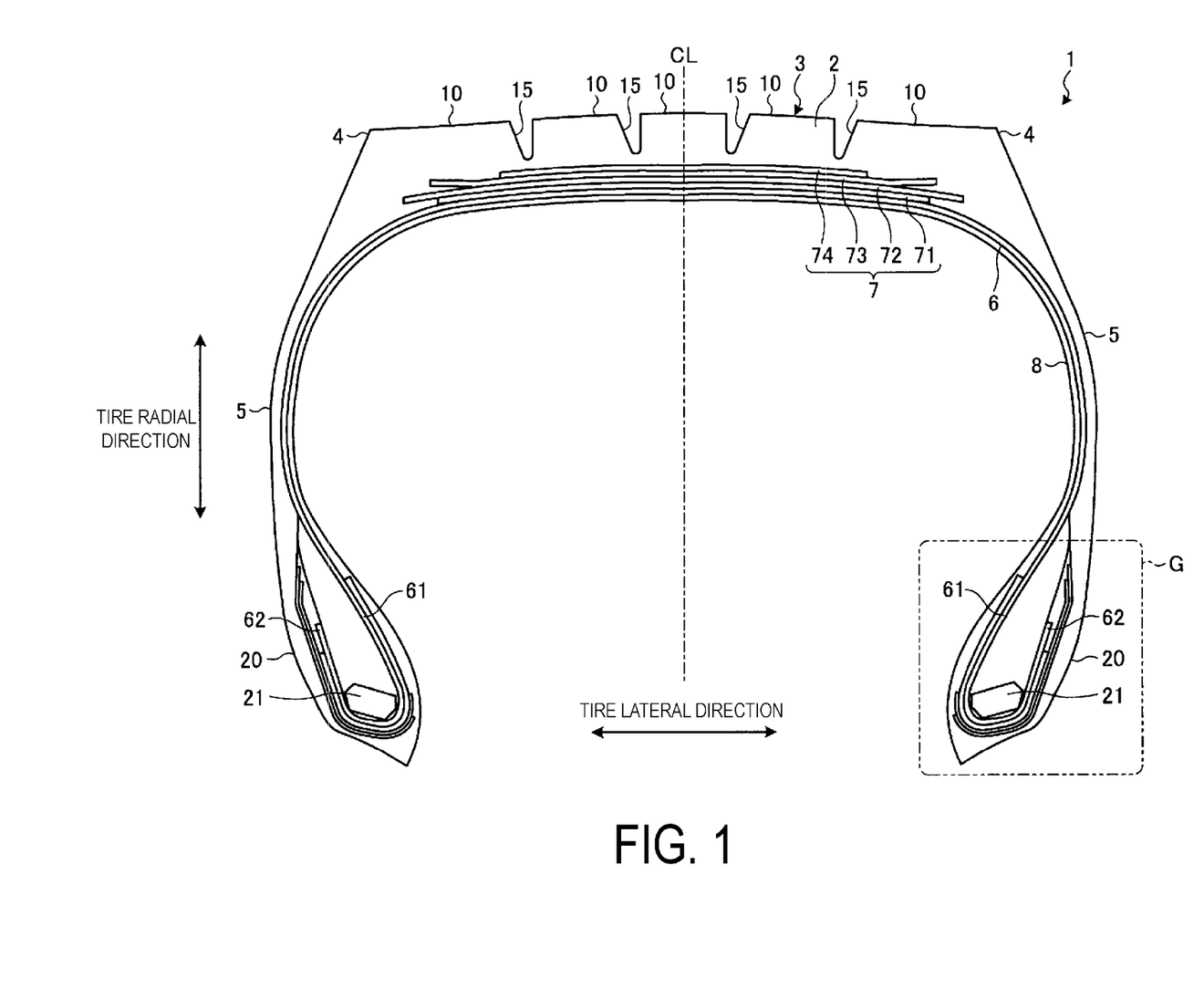
FIG. 1 is a meridian cross-sectional view illustrating a main portion of a pneumatic tire according to an embodiment of the present technology.

FIG. 1 is a meridian cross-sectional view illustrating a main portion of a tire 1 according to an embodiment. "Meridian cross-section" refers to a cross section that passes through the tire rotation axis. The tire 1 is a pneumatic tire and a tubeless tire. The tire 1 is a heavy duty tire mountable on a truck or bus. A tire (heavy duty tire) for a truck or bus refers to a tire specified in Chapter B of the JATMA Year Book (standards of The Japan Automobile Tyre Manufacturers Association, Inc.) published by the Japan Automobile Tyre Manufacturers Association, Inc. (JATMA). Note that the tire 1 may be mountable on a passenger vehicle or may mountable on a light truck.

The tire 1 illustrated in FIG. 1, as viewed in a meridian cross-section, is provided with a tread portion 2 in the outermost portion in the tire radial direction. The surface of the tread portion 2, i.e., the portion that comes into contact with the road surface when a vehicle mounted with the tire 1 travels, is formed as a tread surface 3. A plurality of circumferential main grooves 15 extending in the tire circumferential direction and a plurality of lug grooves (not illustrated) intersecting the circumferential main grooves 15 are formed in the tread surface 3. A plurality of land portions 10 are defined in the tread surface 3 by the circumferential main grooves 15 and the lug grooves. Note that the number of circumferential main grooves 15, the intervals between the lug grooves in the tire circumferential direction, the length and angle of the lug grooves, the groove width and the groove depth of the grooves, and the like are preferably set as appropriate. In other words, a tread pattern formed in the tread surface 3 is preferably set as appropriate.

Ends of the tread portion 2 in the tire lateral direction are formed as shoulder portions 4. Sidewall portions 5 are disposed from the shoulder portions 4 to predetermined positions inward in the tire radial direction. In other words, the sidewall portions 5 are disposed at two positions on either side of the pneumatic tire 1 in the tire lateral direction.

Furthermore, a bead portion 20 is located inward of each sidewall portion 5 in the tire radial direction. The bead portions 20 are disposed at two positions on either side of a tire equatorial plane CL in a similar manner to that of the sidewall portions 5. In other words, the pair of bead portions 20 are disposed on either side of the tire equatorial plane CL in the tire lateral direction. The pair of bead portions 20 each include a bead core 21. The bead core 21 is formed by winding a bead wire, which is a steel wire, into an annular shape.

The bead portion 20 is configured to be mountable on a 15° tapered specified rim. Here, "specified rim" refers to an "applicable rim" defined by JATMA, a "Design Rim" defined by the Tire and Rim Association (TRA), or a "Measuring Rim" defined by the European Tyre and Rim Technical Organisation (ETRTO). In other words, the tire 1 according to the present embodiment can be mounted on the specified rim including a seat portion for the bead portion 20 which is inclined with a 15° inclination angle with respect to the rotation axis.

A belt layer 7 is provided inward of the tread portion 2 in the tire radial direction. The belt layer 7, for example, has a multilayer structure including four belts 71, 72, 73, 74, the belts being made by a process of covering a plurality of belt cords made of steel or an organic fiber material, such as polyester, rayon, and nylon, and then a rolling process. Furthermore, the belts 71, 72, 73, 74 have different set inclination angles of the fiber direction of the belt cords with respect to the tire circumferential direction, and the belts are layered so that the fiber directions of the belt cords intersect each other, i.e., a crossply structure.

A carcass 6 including a ply of radial cords is continuously provided inward of the belt layer 7 in the tire radial direction and along a side of the sidewall portion 5 closer to the tire equatorial plane CL. The carcass 6 is supported by the pair of bead cores 21. The carcass 6 has a single layer structure made of one carcass ply or a multilayer structure made of a plurality of carcass plies, and extends between the bead cores 21 on either side in the tire lateral direction in a toroidal shape, forming the framework of the tire. Specifically, the carcass 6 is disposed from one bead portion 20 to the other bead portion 20 located on either side in the tire lateral direction, and turns back outward in the tire lateral direction along the bead cores 21 at the bead portions 20, wrapping around the bead cores 21. In other words, the carcass 6 is folded back around the bead cores 21 at the bead portions 20, so that the carcass 6 is disposed inward of the bead cores 21 in the tire lateral direction and runs inward of the bead core 21 in the tire radial direction and then outward of the bead core 21 in the tire lateral direction. The carcass 6 disposed in this manner is made by a process of covering a plurality of carcass cords made of steel or an organic fiber material, such as aramid, nylon, polyester, and rayon, and then a rolling process.

Hereinafter, the carcass 6 that folds back at the bead core 21 located at the bead portion 20 includes a portion disposed inward from the bead core 21 in the tire lateral direction referred to as a carcass body portion 61, as appropriate, and a portion formed by the carcass 6 folding back at the bead core 21 disposed outward from the bead core 21 in the tire lateral direction referred to as a carcass folded back portion 62, as appropriate.

Additionally, an innerliner 8 is formed along the carcass 6 on the inner side of the carcass 6 or on the interior side of the tire 1 from the carcass 6.

Figure 2:
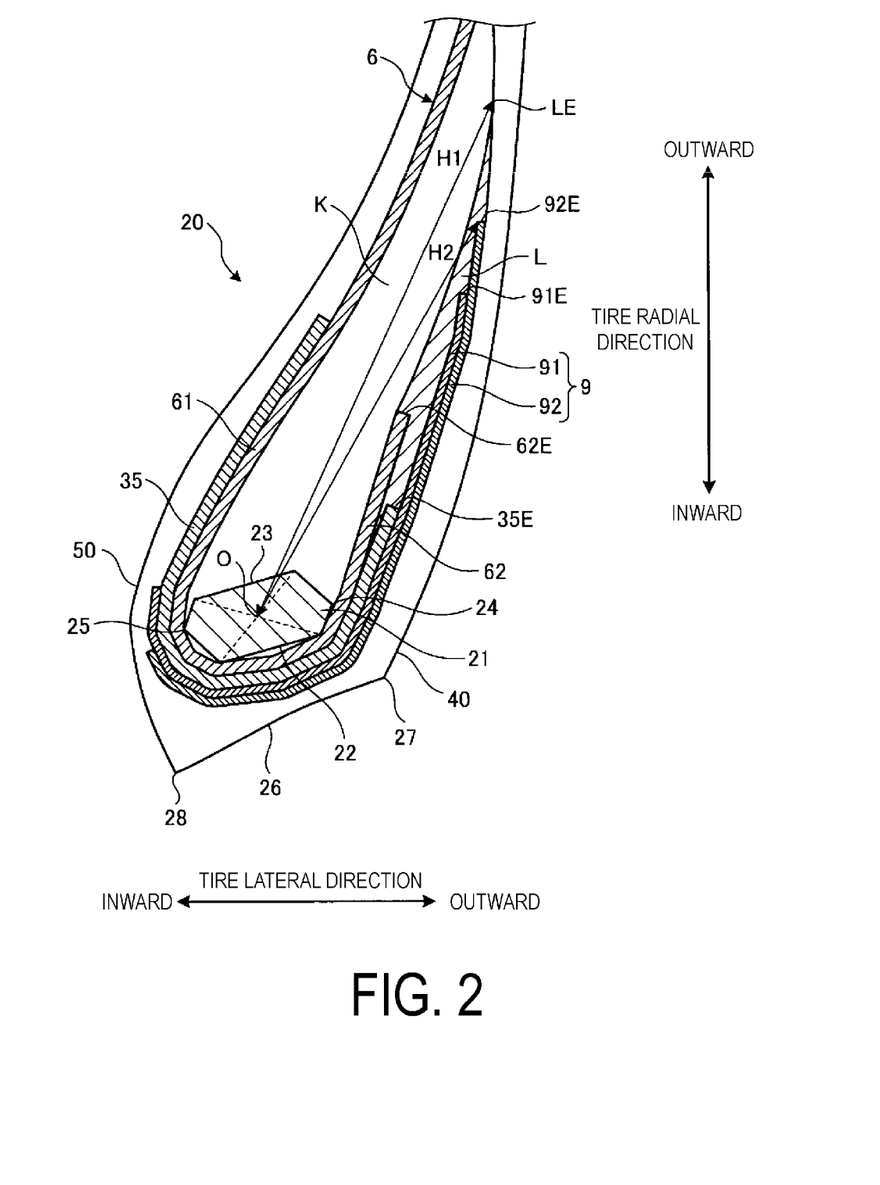
FIG. 2 is a detailed view of portion G of FIG. 1.

FIG. 2 is a detailed view of portion G of FIG. 1. A steel cord reinforcing layer 35 made of steel cords is disposed in a portion where the carcass 6 folds back around the bead core 21. The steel cord reinforcing layer 35 is disposed in contact with the outer surface of the carcass 6 folded back at the bead core 21 and reinforces the carcass 6. The steel cord reinforcing layer 35 is disposed layered on the carcass 6 on the outer side of the carcass 6 at the portion where the carcass 6 is folded back and, in a similar manner to that of the carcass 6, is folded back around the bead core 21 from in to out in the tire lateral direction and is disposed continuously in the tire circumferential direction. In other words, the steel cord reinforcing layer 35 is located inward of the carcass 6 in the tire lateral direction at the portion where the carcass 6 is located inward from the bead core 21 in the tire lateral direction, and is located outward of the carcass 6 in the tire lateral direction at the portion where the carcass 6 is located outward from the bead core 21 in the tire lateral direction.

Additionally, the bead core 21 formed by winding a bead wire into an annular shape has a shape when viewed in a meridian cross-section that is substantially hexagonal. Specifically, the bead core 21, when viewed overall, has a substantially hexagonal shape and includes an inner circumferential surface 22 and an outer circumferential surface 23, which have a parallel orientation inclined inward in the tire radial direction as they run from outward to inward in the tire lateral direction, a corner portion 24 projecting outward in the tire lateral direction at an outer position in the tire lateral direction, and a corner portion 25 projecting inward in the tire lateral direction at an inner position in the tire lateral direction. Note that the inner circumferential surface 22 is a surface of the bead core 21 facing inward in the tire radial direction and the outer circumferential surface 23 is a surface of the bead core 21 facing outward in the tire radial direction.

In the present embodiment, of the six sides of the hexagonal shape of the bead core 21, when viewed in a meridian cross-section, the side specified as the outer circumferential surface 23 is the longest. Note that the side specified as the inner circumferential surface 22 may be the longer, or the side specified as the outer circumferential surface 23 and the side specified as the inner circumferential surface 22 may be equal in length.

In a similar manner, a bead base portion 26, which is the inner circumferential surface of the bead portion 20, inclines in a direction inward in the tire radial direction as it runs from outward to inward in the tire lateral direction. Note that the inner circumferential surface of the bead portion 20 is a surface of the bead portion 20 facing inward in the tire radial direction. In other words, a bead toe 28, which is an inner end portion of the bead base portion 26 in the tire lateral direction, is more inclined in a direction inward in the tire radial direction than a bead heel 27, which is an outer end portion of the bead base portion 26 in the tire lateral direction. The bead base portion 26 is provided as an engaging portion that engages and comes into contact with the specified rim when the tire 1 according the present embodiment is mounted on the specified rim.

In the bead portion 20, a tire outer surface 40 is curved projecting outward in the tire lateral direction. In other words, the portion of the tire outer surface 40 at the bead portion 20, the outer surface 40 being a surface on the side of the tire 1 exposed to the outside air, is curved projecting outward in the tire lateral direction. The bead heel 27, i.e., one end portion of the bead base portion 26, is the intersection point between the tire outer surface 40 and the bead base portion 26.

In the bead portion 20, a tire inner surface 50 is curved projecting inward in the tire lateral direction. In other words, the portion of the tire inner surface 50 at the bead portion 20, the inner surface 50 being a surface on the side of the tire 1 filled with air, is curved projecting inward in the tire lateral direction. The bead toe 28, i.e., the other end portion of the bead base portion 26, is the intersection point between the tire inner surface 50 and the bead base portion 26.

Additionally, the bead portion 20 is provided with a bead rubber layer K. At least a portion of the bead rubber layer K is disposed between the carcass body portion 61 and the carcass folded back portion 62. The bead rubber layer K is also known as a bead filler.

Furthermore, an organic fiber reinforced layer 9 known as a nylon chafer is disposed outward from the carcass folded back portion 62 in the tire lateral direction. The organic fiber reinforced layer 9 includes an inner reinforcing layer 91 disposed in contact with the steel cord reinforcing layer 35 and an outer reinforcing layer 92 disposed in contact with the outer surface of the inner reinforcing layer 91. The inner reinforcing layer 91 is disposed layered on the steel cord reinforcing layer 35 on the outer side of the steel cord reinforcing layer 35 at the portion where the steel cord reinforcing layer 35 is folded back and, in a similar manner to that of the carcass 6 and the steel cord reinforcing layer 35, is folded back around the bead core 21 from in to out in the tire lateral direction and is disposed continuously in the tire circumferential direction. The outer reinforcing layer 92 is disposed layered on the inner reinforcing layer 91 on the outer side of the inner reinforcing layer 91 at the portion where the inner reinforcing layer 91 is folded back and, in a similar manner to that of the carcass 6, the steel cord reinforcing layer 35, and the inner reinforcing layer 91, is folded back around the bead core 21 from in to out in the tire lateral direction and is disposed continuously in the tire circumferential direction.

A first reinforcing rubber layer L is disposed in the space surrounded by the bead rubber layer K, the organic fiber reinforced layer 9, the carcass folded back portion 62, and the steel cord reinforcing layer 35. The first reinforcing rubber layer L is disposed in contact with the outer surface of the bead rubber layer K in the tire lateral direction, an outer edge portion 62E of the carcass folded back portion 62 located outward in the tire radial direction, an outer edge portion 35E of the steel cord reinforcing layer 35 located outward in the tire radial direction, an outer edge portion 91E of the inner reinforcing layer 91 located outward in the tire radial direction, and an outer edge portion 92E of the outer reinforcing layer 92 located outward in the tire radial direction. The hardness of the first reinforcing rubber layer L is greater than the hardness of the bead rubber layer K but lower than the hardness of the carcass 6, the steel cord reinforcing layer 35, and the organic fiber reinforced layer 9. Note that hardness is a value measured by a type A durometer in accordance with JIS (Japanese Industrial Standard) K 6253-3:2012.

The outer edge portions 91E, 92E of the organic fiber reinforced layer 9 are disposed outward from the carcass folded back portion 62 (the outer edge portion 62E) in the tire lateral direction and disposed outward from the carcass folded back portion 62 in the tire radial direction. The outer edge portion 62E of the carcass folded back portion 62 is disposed outward from the outer edge portion 35E of the steel cord reinforcing layer 35 in the tire radial direction. The outer edge portion 92E of the outer reinforcing layer 92 is disposed outward from the outer edge portion 91E of the inner reinforcing layer 91 in the tire radial direction. An outer edge portion LE of the first reinforcing rubber layer L is disposed outward from the outer edge portion 92E of the outer reinforcing layer 92 in the tire radial direction.

Figure 3:
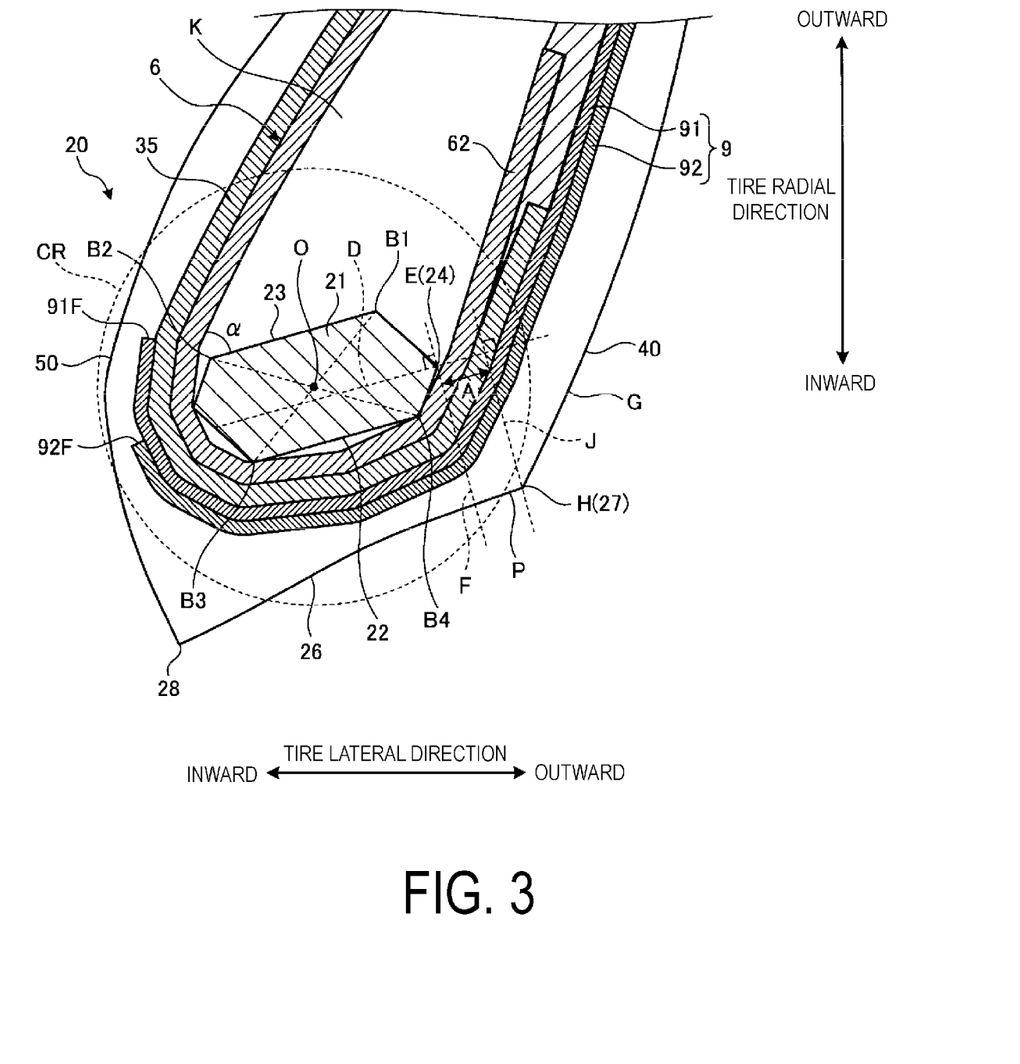
FIG. 3 is an enlarged view of a portion of FIG. 2.

FIG. 3 is an enlarged view of a portion of FIG. 2. Specified values such as respective dimensions of constituents of the bead portion 20 according to the present embodiment will be described below with reference to FIGS. 2 and 3. The specified values described below are specified values when the tire 1 is not mounted on the specified rim. In other words, the specified values are specified values of the tire 1 in a state prior to being mounted on the specified rim and are specified values in a meridian cross-section of the tire 1 after vulcanization molding via a mold. For the sake of convenience, the specified values are in a meridian cross-section of the tire 1 set by the linear distance between imaginary intersection points H (the distance between the imaginary intersection points H of the pair of bead portions 20) described below when the tire is stood up by itself.

As illustrated in FIG. 3, in a meridian cross-section of the bead portion 20, a first line segment D passing through an outermost projecting point E of the bead core 21 in the tire lateral direction and being parallel with the longest side of the bead core 21, a side P of the bead base portion 26 closer to the bead heel 27 that is a portion of the bead portion 20 that comes into contact with the specified rim, a curved line G of the tire outer surface 40 that is a portion of the bead portion 20 that is located outward from the bead base portion 26 in the tire lateral direction, a first intersection point H of the side P and the curved line G, a second line segment J passing through the first intersection point H and being perpendicular to the first line segment D, and a third line segment F passing through the projecting point E and being perpendicular to the first line segment D are specified.

The projecting point E includes the corner portion 24. The projecting point E, in a meridian cross-section, is in the center of the outermost bead wire in the tire lateral direction of the bead wires of the bead core 21 and is a point where the first line segment D parallel with the longest side of the bead core 21 meets the profile of the bead wires. The longest side is specified as the outer circumferential surface 23. The first intersection point H includes the bead heel 27.

In the present embodiment, a distance A between the second line segment J and the third line segment F is from 4 mm to 12 mm.

Additionally, in the present embodiment, a bead core center O is specified. In a meridian cross-section, of the vertices (six in the present embodiment) of the polygonal (hexagonal in the present embodiment) bead core 21, a bead wire B1 located at the outermost vertex in the tire radial direction, a bead wire B2 located at the second outermost vertex in the tire radial direction after the bead wire B1, a bead wire B3 located at the innermost vertex in the tire radial direction, and a bead wire B4 located at the second innermost vertex in the tire radial direction after the bead wire B3 are specified. "Bead core center O" refers to, in a meridian cross-section, an intersection point of a diagonal line joining the center of the bead wire B1 and the center of the bead wire B3 and a diagonal line joining the center of the bead wire B2 and the bead wire B4.

The inner reinforcing layer 91 of the organic fiber reinforced layer 9 includes an inner edge portion 91F located inward from the outer edge portion 91E in the tire radial direction and inward from the outer edge portion 91E in the tire lateral direction. The outer reinforcing layer 92 of the organic fiber reinforced layer 9 includes an inner edge portion 92F located inward from the outer edge portion 92E in the tire radial direction and inward from the outer edge portion 92E in the tire lateral direction. The inner edge portions 91F, 92F of the organic fiber reinforced layer 9 are disposed within a 20 mm radius from the bead core center O. In other words, in a meridian cross-section, the inner edge portions 91F, 92F are disposed within a circle CR centered at the bead core center O with a radius of 20 mm.

As described above, the outer edge portion LE of the first reinforcing rubber layer L located outward in the tire radial direction is disposed outward in the tire radial direction from the outer edge portion 92E of the organic fiber reinforced layer 9 (outer reinforcing layer). As illustrated in FIG. 2, in a meridian cross-section, a first height H1, which is the distance from the bead core center O to the outer edge portion LE of the first reinforcing rubber layer L, and a second height H2, which is the distance from the bead core center O to the outer edge portion 92E of the organic fiber reinforced layer 9 are specified.

In the present embodiment, the difference between the first height H1 and the second height H2 is from 3 mm to 15 mm.

Additionally, in the present embodiment, the complex modulus of the first reinforcing rubber layer L is from 6 MPa to 10 MPa, and the elongation at break of the first reinforcing rubber layer L is from 300% to 450%. The viscoelastic characteristics are values measured in accordance with JIS K 7244-4:1999 (measurement temperature: 60° C., initial strain: 10%, amplitude: ±1%, frequency: 10 Hz, deformation mode: tensile). Elongation at break is the elongation at break according to JIS K 6251:2110.

Figure 4:
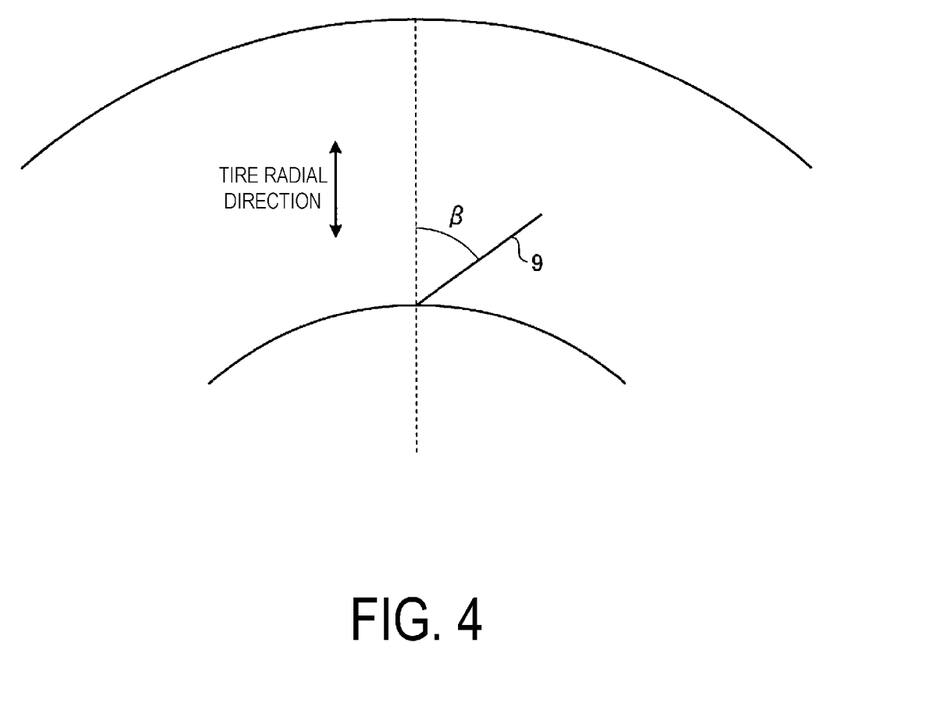
FIG. 4 is a diagram schematically illustrating an organic fiber reinforced layer according to an example.

Additionally, as schematically illustrated in FIG. 4, a fiber orientation angle β of the organic fiber reinforced layer 9 with respect to the tire radial direction (an imaginary line extending in the tire radial direction) is from 45° to 75°. "Fiber orientation angle β" is an angle measured within a 20 mm range from the outer edge portions 91E, 92E of the organic fiber reinforced layer 9 inward in the tire radial direction. An example of the measurement method is described below. A marking-out line is drawn on the tire surface in the tire radial direction. Being careful not to remove either end of the marking-out line, the rubber of the sidewall portion 5 is peeled off to expose the organic fiber reinforced layer 9. The marking-out line is redrawn on the organic fiber reinforced layer 9 by joining the two ends of the marking-out line on the tire surface. The fiber orientation angle β of the organic fiber reinforced layer 9 is measured in reference to this marking-out line.

As described above, according to the present embodiment, the distance A is from 4 mm to 12 mm. This allows an angle α (see FIG. 3) formed by the carcass body portion 61 and the outer circumferential surface 23 of the bead core 21 to be decreased. As a result, in the tire 1 before and after being inflated with air, the amount of change in position of the carcass 6 located near the bead portion 20 can be reduced. This allows the strain acting on the first reinforcing rubber layer L and the bead rubber layer K located adjacent to the outer edge portions 91E, 92E of the organic fiber reinforced layer 9 to be reduced, and cracking from the outer edge portions 91E, 92E of the organic fiber reinforced layer 9 to be suppressed.

Typically, to reduce the amount of change in position of the carcass 6 located near the bead portion 20 before and after inflation, the distance between the pair of bead portions 20 is lessened. However, this approach has the drawback of making the bead portions 20 difficult to mount on the specified rim when the tire 1 is inflated with air. According to the present embodiment, cracking can be suppressed while mountability of the bead portions 20 on the specified rim is maintained.

When the distance A is greater than 12 mm, the volume of the bead rubber layer K increases to a level which deteriorates heat build-up and the durability of the bead portion 20. When the distance A is less than 4 mm, the angle α cannot be made small enough. As a result, the effect of reducing the strain acting on the first reinforcing rubber layer L and the bead rubber layer K located adjacent to the outer edge portions 91E, 92E of the organic fiber reinforced layer 9 cannot be obtained. Thus, the distance A is preferably from 4 mm to 12 mm, more preferably from 4 mm to 8 mm, and even more preferably from 5 mm to 7 mm.

Additionally, in the present embodiment, the complex modulus of the first reinforcing rubber layer L is from 6 MPa to 10 MPa, and the elongation at break of the first reinforcing rubber layer L is from 300% to 450%. This allows the strain acting on the first reinforcing rubber layer L adjacent to the outer edge portions 91E, 92E of the organic fiber reinforced layer 9 to be reduced, the elongation at break to be maintained at a certain level, and cracking in the first reinforcing rubber layer L and the bead rubber layer K originating at the outer edge portions 91E, 92E of the organic fiber reinforced layer 9 to be suppressed.

When the complex modulus is greater than 10 MPa, the elongation at break is less than 300%. This increases the possibility of cracking in the first reinforcing rubber layer L and the bead rubber layer K originating at the outer edge portions 91E, 92E. When the complex modulus is less than 6 MPa, the strain acting on the first reinforcing rubber layer L located adjacent to the outer edge portions 91E, 92E of the organic fiber reinforced layer 9 increases. This also increases the possibility of cracking in the first reinforcing rubber layer L and the bead rubber layer K. By the physical properties of the first reinforcing rubber layer L being within the ranges described above, cracking can be suppressed.

Additionally, in the present embodiment, the difference between the first height H1 and the second height H2 is from 3 mm to 15 mm. This improves the durability of the bead portion 20. When the difference between the first height H1 and the second height H2 is less than 3 mm, the strain acting on the first reinforcing rubber layer L located adjacent to the outer edge portions 91E, 92E of the organic fiber reinforced layer 9 increases. This increases the possibility of cracking in the first reinforcing rubber layer L and the bead rubber layer K. When the difference between the first height H1 and the second height H2 is greater than 15 mm, the volume of the first reinforcing rubber layer L increases to a level which deteriorates the heat build-up of the bead portion 20 and the durability of the bead portion 20. Thus, the difference between the first height H1 and the second height H2 is preferably from 3 mm to 15 mm, and more preferably from 5 mm to 13 mm.

In the present embodiment, the fiber orientation angle β of the organic fiber reinforced layer 9 with respect to the tire radial direction is from 45° to 75°. This improves the durability of the bead portion 20. When the fiber orientation angle β is less than 45°, the possibility of cracking increases. When the fiber orientation angle β is greater than 75°, the effect of suppressing the strain acting on the first reinforcing rubber layer L located adjacent to the carcass folded back portion 62 is reduced, and the effect of reinforcing the bead portion 20, which is a desired performance of the organic fiber reinforced layer 9, is not reduced. Thus, the fiber orientation angle β is preferably from 45° to 75°, and more preferably from 55° to 70°.

Examples

Figure 5:
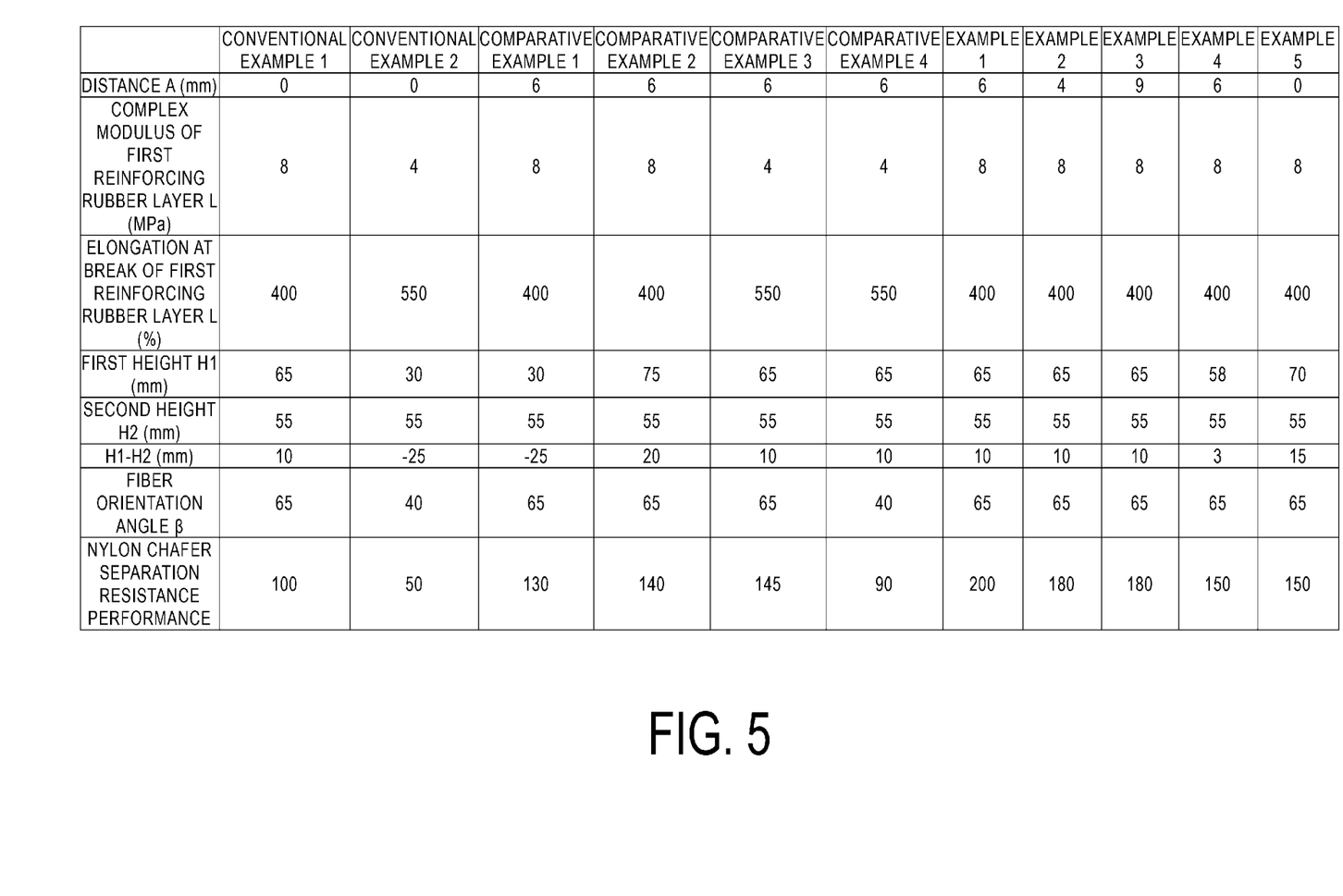
FIG. 5 is a table showing the results of performance tests of pneumatic tires according to embodiments of the present technology.

FIG. 5 is a table showing the results of performance tests of the tire 1. In relation to the tire 1 described above, performance evaluation tests conducted on the tires 1 of the Conventional Examples and Comparative Examples and the tires 1 according to embodiments of the present technology will be described below. The performance evaluation tests were conducted to evaluate nylon chafer separation resistance performance, which indicates resistance to cracking in the bead portion 20 originating at the organic fiber reinforced layer 9.

In the performance evaluation tests, the tires 1 with a size of 275/70R22.5 were mounted on the rim wheel of a 15° tapered specified rim defined by JATMA, inflated to an air pressure 140% of a specified air pressure defined by JATMA, and loaded with 1.4 times a specified load defined by JATMA, then run on an indoor drum testing machine at a running speed of 49 km/h until the tires 1 failed. The running distance until failure was evaluated.

As indicated in FIG. 5, the evaluation test was conducted on the tires 1 of Conventional Examples 1, 2, the tires 1 of Comparative Examples 1 to 4, and the tires 1 of Examples 1 to 5, which are embodiments of the present technology. These tires 1 each have a different configuration for the bead portions 20. As indicated in FIG. 5, in the tire 1 of Conventional Example 1, the distance A is outside the technical scope of the present technology, and in the tire 1 of Conventional Example 2, the constituents are all outside the technical scope of the present technology. The tires 1 of Comparative Examples 1 to 4 all have a constituent outside the technical scope of the present technology.

To evaluate the nylon chafer separation resistance performance, results were expressed as index values and evaluated, with result of Conventional Example 1 being defined as the reference (100). Higher values indicate superior nylon chafer separation resistance performance.

As indicated in FIG. 5, the tires 1 of Examples 1 to 5 have superior nylon chafer separation resistance performance compared to the tires 1 of the Conventional Examples and Comparative Examples. In other words, the tires 1 of Examples 1 to 5 can provide effective suppression of cracking from the edge of the organic fiber reinforced layer 9.

The invention claimed is:

1. A pneumatic tire mountable on a 15° tapered specified rim, the pneumatic tire comprising:
    a pair of bead portions disposed on either side of a tire equatorial plane in a tire lateral direction;
    a bead core provided in each of the pair of bead portions;
    a carcass supported by the pair of bead cores, the carcass comprising a carcass body portion and a carcass folded back portion formed by the carcass folding back at the bead core;
    a steel cord reinforcing layer disposed on an outer surface of the carcass folded back at the bead core;
    a bead rubber layer with at least a portion thereof disposed between the carcass body portion and the carcass folded back portion;
    an organic fiber reinforced layer comprising an outer edge portion disposed outward from the carcass folded back portion in the tire lateral direction and outward from the carcass folded back portion in a tire radial direction, and an inner edge portion disposed within a 20 mm radius radially outward from a bead core center, the organic fiber reinforced layer being folded around the bead core with the inner edge portion positioned on an axially inner side of the bead core and positioned radially inward of a radially outermost point of the bead core; and
    a first reinforcing rubber layer disposed in space surrounded by the bead rubber layer, the organic fiber reinforced layer, the carcass folded back portion, and the steel cord reinforcing layer;
    when the pneumatic tire is not mounted on the specified rim,
    a distance from a second line segment to a third line segment being from 4 mm to 12 mm, a complex modulus of the first reinforcing rubber layer being from 6 MPa to 10 MPa, and an elongation at break of the first reinforcing rubber layer being from 300% to 450%, wherein a first line segment passing through an outermost projecting point of the bead core in the tire lateral direction and being parallel with a longest side of the bead core, a side of a bead base portion closer to a bead heel that is a portion of the bead portion that comes into contact with the specified rim, a curved line of a tire outer surface that is a portion of the bead portion that is located outward from the bead base portion in the tire lateral direction, a first intersection point of the side and the curved line, the second line segment passing through the first intersection point and being perpendicular to the first line segment, and the third line segment passing through the projecting point and being perpendicular to the first line segment are specified,
    a difference between a first height and a second height being from 3 mm to 15 mm, wherein an outer edge portion of the first reinforcing rubber layer located outward in the tire radial direction is disposed outward in the tire radial direction from the outer edge portion of the organic fiber reinforced layer located outward in the tire radial direction, and the first height, which is a distance from the bead core center to the outer edge portion of the first reinforcing rubber layer, and the second height, which is a distance from the bead core center to the outer edge portion of the organic fiber reinforced layer, are specified, and an outer edge portion of the steel cord reinforcing layer is located radially inward of a radially outer edge of the carcass folded back portion, the outer edge portion of the steel cord reinforcing layer being located inward in the tire radial direction of an inner edge portion of the steel cord reinforcing layer in the tire lateral direction.

2. The pneumatic tire according to claim 1, wherein a fiber orientation angle of the organic fiber reinforced layer with respect to the tire radial direction is from 45° to 75°.

3. The pneumatic tire according to claim 1, wherein the organic fiber reinforced layer comprises a plurality of organic fiber reinforced layers, where the inner edge portion of a first organic fiber reinforced layer of the plurality of organic fiber reinforced layers is disposed within the 20 mm radius radially outward from the bead core center and a second organic fiber reinforced layer of the plurality of organic fiber reinforced layers is disposed within a 20 mm radius radially inward from the bead core center, and where the inner edge portion of each of the plurality of organic fiber reinforced layers is disposed axially inward of an axially innermost point of the bead core and radially outward of a radially innermost point of the bead core.

4. The pneumatic tire according to claim 1, wherein the first reinforcing rubber layer is disposed between the organic fiber reinforced layer and the carcass folded back portion, and the first reinforcing rubber layer extends radially outward beyond a radially outermost end of the organic fiber reinforced layer.

* * * * *